United States Patent [19]

Lang et al.

[11] Patent Number: 5,018,007
[45] Date of Patent: May 21, 1991

[54] THIN PROJECTION SCREEN HAVING A LIQUID CRYSTAL DISPLAY SCREEN OVERLAID A SHEET OF FIBER OPTIC CABLES

[75] Inventors: Paul W. Lang; Franklin C. Gribshaw, both of Newport Beach, Calif.

[73] Assignee: Universal Applied Sciences Inc., Newport Beach, Calif.

[21] Appl. No.: 389,772

[22] Filed: Aug. 4, 1989

[51] Int. Cl.$^5$ ............................................. H04N 9/31
[52] U.S. Cl. ..................................... 358/60; 358/230; 358/231; 358/901
[58] Field of Search ................... 358/56, 59, 60, 230, 358/231, 240, 901

[56] References Cited

U.S. PATENT DOCUMENTS

| | | | |
|---|---|---|---|
| 4,280,125 | 7/1981 | Kazan | 358/230 |
| 4,578,709 | 3/1986 | Lang et al. | |
| 4,611,245 | 9/1986 | Trias | 358/231 |
| 4,640,592 | 2/1987 | Nishimura et al. | 358/901 |

OTHER PUBLICATIONS

Plasma Display/Memory Units Clear . . . Comfortable . . . Compact No CRT Can Match It Catalog, by Electro Plasma.
Liquid Crystal Display Catalog, by Stanley, dated 1985.4.

Primary Examiner—Howard W. Britton
Assistant Examiner—Kim Yen Vu
Attorney, Agent, or Firm—Kelly, Bauersfeld & Lowry

[57] ABSTRACT

A relatively thin projection screen includes a sheet of parallel, specially treated fiber optic cables that emit light transversely, and an overlying liquid crystal display screen formed of a plurality of adjacent and individually modulatable liquid crystal shutters. A dot matrix of pixels is generated by controlling the sequential transmission of light to the optical fibers, and the transparency or opacity of the overlying shutters. As each row of the optical fibers is sequentially energized by a light source, the columns of liquid crystal shutters are simultaneously opened or closed in accordance with signals derived from a television video signal. This provides an optical reproduction of the television signal from the pixels of light defined at the cross over points of the rows and columns. The liquid crystal shutters are modulated to allow a varying amount of light to pass through so that different levels of brightness may be obtained. In one embodiment, a scanning laser sequentially energizes and illuminates the fiber optic cables. In another embodiment, a light source illuminates a shutter that, in turn, controls the sequential illumination of the fiber optic cables. A control apparatus ensures that operation of the liquid crystal shutters is synchronized with the sequential illumination of the fiber optic cables to recreate the video image from the input signal.

30 Claims, 2 Drawing Sheets

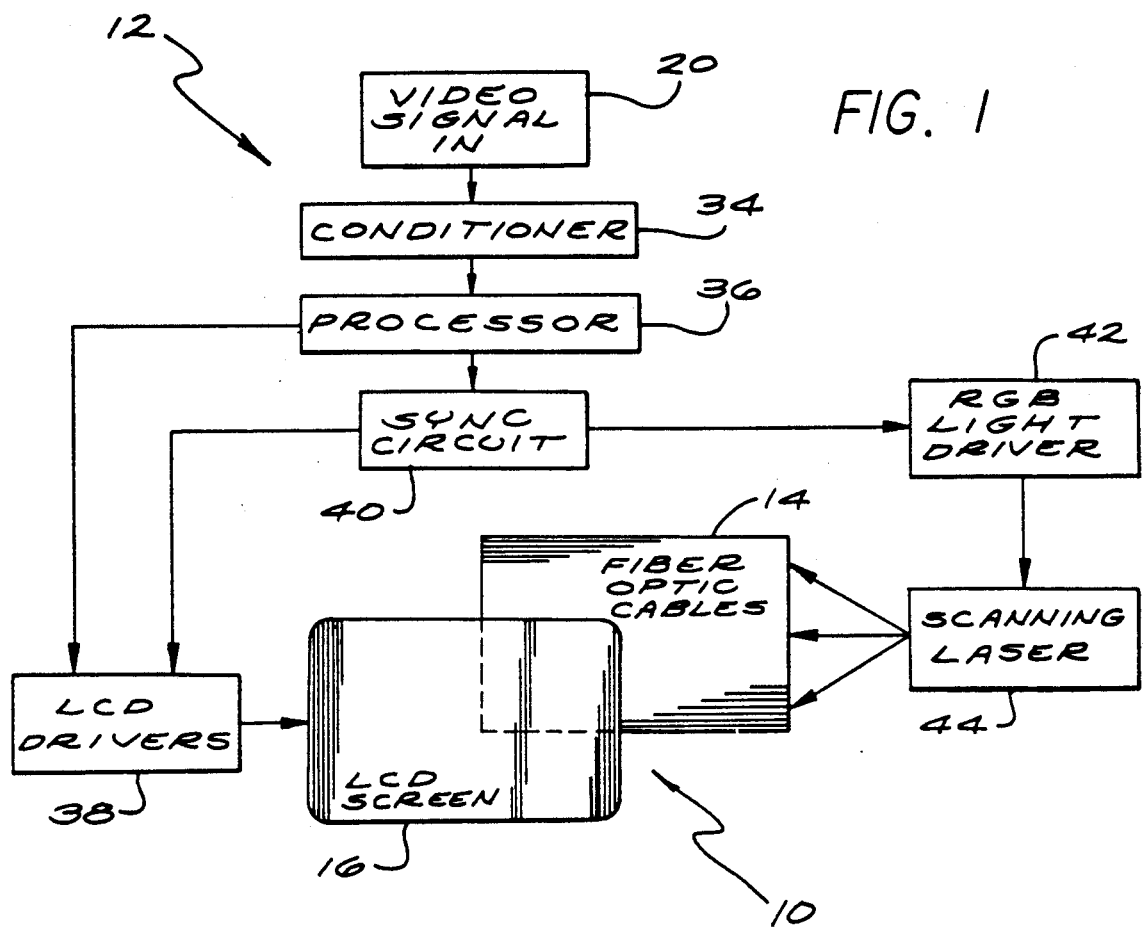
FIG. 1
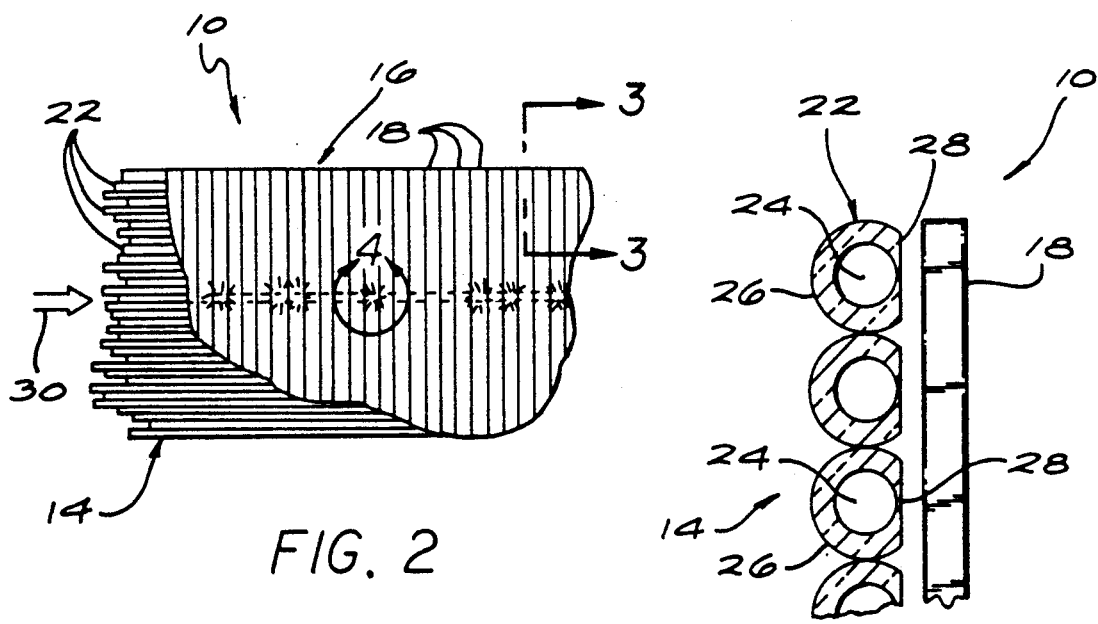
FIG. 2
FIG. 3

THIN PROJECTION SCREEN HAVING A LIQUID CRYSTAL DISPLAY SCREEN OVERLAID A SHEET OF FIBER OPTIC CABLES

BACKGROUND OF THE INVENTION

Cathode ray tube (CRT) screens are projection devices typically comprising an electron gun, circuitry to control the path of the electrons emitted, and a phosphor coated screen that glows after an electron strikes the screen. While CRT's have been a standard display projection device for many years, certain fundamental and characteristically inherent features of the CRT present problems and limitations.

The typical CRT screen is heavy and difficult to move, and thus dictates to the viewer his viewing position. Once in place, CRT screens including most televisions usually remain where initially positioned due to weight and maneuverability restrictions. While problems caused by the weight and bulk of CRT screens can be remedied in some instances by the use of a smaller CRT, using a smaller CRT also decreases the screen size. CRT screens are limited in size due to the requirement that the electrons must travel in a vacuum. Much of the weight and bulk of a CRT is due to the heavy walls containing the vacuum. As the size of the screen increases, the walls necessarily become heavier and thicker. There comes a point where it is not economically or mechanically feasible to make a large CRT screen.

CRT screens also emit radiation from electron acceleration and deceleration. Electron acceleration occurs at the electron gun where the electrons are emitted. Deceleration occurs at the phosphor coated screen where the electrons collide with the screen. While some of this radiation can be shielded from the viewer, often this shielding is not totally effective. This radiation may cause eye fatigue and strain after extended viewing of the CRT screen.

In an attempt to solve the limitations and problems of CRT screens, liquid crystal display (LCD) screens have been used with limited success. A liquid crystal is an electronic device that alters its ability to pass light when a voltage is applied. In an LCD screen, liquid crystals are arranged to form a matrix allowing particular selection of each liquid crystal so that light and dark areas may be formed on the screen. In one typical use, characters such as letters or numbers are represented by darkening appropriate liquid crystals, preventing light from behind those liquid crystals from reaching the viewer.

Many LCD screens, however, do not present clear images as the contrast between light and dark regions is not remarkably distinct. Further, LCD screens do not display images in color, limiting their use as entertainment and graphic display devices. In comparison with other projection devices, LCD screens have been consistently slower in changing from one image to another. This has prevented LCD screens from acting as projection display devices of sequential images such as the ones in usual television transmissions. Accordingly, while LCD screens avoid most of the problems associated with CRT screens, LCD screens do not project sequential images as do typical CRT screens.

Lightweight, non-radiating screens composed of a bundle of fiber optic cables viewed on end have been used to overcome the disadvantages of LCD and CRT screens. In such a screen, fiber optic cables are used to conduct light from a projection system to the screen so that the images presented may be viewed. A crude way of doing this is to have one end of the organized fiber optic cable bundle pressed next to a CRT screen so that the CRT image illuminates the bundle, transmitting the image. The other end of the fiber optic cable bundle is then fixed for viewing so that the viewer sees the CRT projection. In this case, the fiber optic cable bundle acts as an extension for the CRT. As fiber optic cables do not transmit the radiation associated with CRTs, eye strain from extended viewing is avoided. A fiber optic cable screen is lighter in weight and more maneuverable, although in a crude configuration a large heavy projection system may be present while the fiber optic cable screen is limited in maneuverability by its umbilical attachment to the CRT.

For the normal television signal composed of 525 raster rows each composed of 380 segments, 199,500 individual fiber optic cables are required for one to one representation of a video signal. This large number of individual fiber optic cables tends to make a fiber optic cable screen hard to handle. Furthermore, if the fiber optic cable screen is significantly larger than the size of the originally received image, the resulting image becomes grainy and less pleasing for a viewer.

Large screen projection televisions are another means for projecting or displaying images. With large screen projection televisions, colored light is projected onto a viewing screen. As with CRT screens, the large screen projection television is a bulky device. The screen itself is large and must be precisely placed in relation to its projector. Many large screen projection televisions have the large screen attached to the projector. Additionally, large screen televisions dictate the viewer's position in relation to the screen as the screen projects a clear and pleasing image to a restricted viewing area. Outside this area, the image is distorted and blurred.

In an attempt to overcome these problems, viewing systems have been developed that are light, maneuverable, and which emit no irritating radiation. An example is shown in U.S. Pat. No. 4,578,709. Although such a flat optical television screen has provided significant advancements over typical CRT screens, additional features and useful modifications are desirable in order to provide a more commercially acceptable and technically superior product.

There exists, therefore a need for a visual display that overcomes the disadvantages of bulk, weight and unmaneuverability. Additionally, a need exists for a display system that emits no eye-fatiguing radiation. These disadvantages should be eliminated while preserving the advantageous viewing characteristics of previous projection screens. Further, a need exists for an improved projection screen that uses a combination of light emitting sources and light controlling shutters to present an image. Such a system would preferably be of simplified construction and maximize the size of the projected image with respect to the overall physical housing for the viewing system. The present invention fulfills these needs and provides further related advantages.

SUMMARY OF THE INVENTION

The present invention resides in an improved thin projection screen capable of accurately recreating an optical image from an input video signal. The thin projection screen comprises, generally, a medium capable of emitting light laterally from its path, means for sequentially feeding light into successive portions of the medium, and means for intercepting light emitted laterally from the medium. The light intercepting means includes a plurality of shutters which overlie the medium in a manner controlling transmission of and the intensity of the medium-emitted light permitted to pass therethrough for viewing. Further, in order to recreate the optical image, means are provided for modulating the shutters of the intercepting means in response to an input video signal and in synchronization with light being emitted by successive portions of the medium.

More particularly, a process is provided for converting a video signal into an image on a screen. This process entails the provision of a screen comprising a plurality of rows which can be selectively illuminated, and a plurality of columns interposed over the rows for modulating the light emitted from the rows. An input video signal is processed into data corresponding to the plurality of rows and columns, and a light source is driven to sequentially illuminate the rows. As each row is individually illuminated, light transmission therefrom to a viewer is controlled by modulating the columns, wherein the column modulation produces a dot matrix which creates an image corresponding to the video signal.

In a preferred form of the invention, the screen comprises a sheet of fiber optic cables and an overlying liquid crystal display (LCD) screen. Each of the fiber optic cables includes an inner light conducting core and an outer light insulating sheath that has a flat surface through which light escapes laterally through the fiber optic cable. The flat surfaces of the fiber optic cables are coplanar to commonly direct light escaping therefrom in a selected direction toward the LCD screen.

The LCD screen is positioned immediately adjacent to the underlying sheet of fiber optic cables to intercept light emitted therefrom in the selected direction. The LCD screen includes a plurality of liquid crystal display panels which are oriented generally perpendicularly to the longitudinal axes of the fiber optic cables to create a dot-matrix of pixels formed by the intersection of a single fiber optic cable and a single liquid crystal display panel. The liquid crystal display panels form shutters over the underlying fiber optic cable sheet and each panel is independently modulatable to control passage of light therethrough and the intensity of the light permitted to pass therethrough as emitted from an underlying fiber optic cable.

An optical image is recreated from an input video signal by simultaneously modulating each individual shutter as a selected portion of the fiber optic cable sheet is illuminated so as to project light in the selected direction. Preferably, only one fiber optic cable is illuminated at a time. As each subsequent fiber optic cable is sequentially illuminated, the LCD screen, and all of the shutters provided thereby, is re-modulated to recreate the optical image. This process occurs extremely rapidly so that the human eye cannot perceive the sequential illumination of each row of the fiber optic cable sheet, nor the modulation of the LCD screen as each fiber optic cable is illuminated. The speed of operation of the thin projection screen normally corresponds with the frequency of the input video signal.

In order to properly control and coordinate operation of the LCD screen in conjunction with illumination of individual fiber optic cables, a control apparatus is provided which includes means for digitizing the incoming video signal, and means for processing the digitized video signal into separate signals for controlling modulation of the liquid crystal display panels and for controlling light input to the fiber optic cables. Means are further provided for synchronizing modulation of all of the liquid crystal display panels with a corresponding illuminated portion of the fiber optic cable sheet. An LCD driver receives signals from the processing means, stores the modulation sequence until signaled by the synchronizing means, and then sends the stored sequence received from the processing means to the liquid crystal display panels so they modulate light emitted by the underlying illuminated portion of the fiber optic cable sheet as is appropriate to present the image represented by the input video signal.

A light source is provided for sequentially illuminating the fiber optic cables as required by the video signal. A light driver which receives input signals from the synchronizing means controls operation of the light source.

Two light sources are shown in the drawings. One light source includes the provision of a scanning laser assembly capable of illuminating individual cables of the fiber optic sheet in a sequential manner. When a colored optical image is desired, three such scanning lasers are utilized to provide the basic red, green and blue light required. An alternative light source includes a light capable of fully illuminating all of the fiber cables simultaneously, and an associated shutter which is interposed between the fiber optic cables and the light source to control illumination of the cables. The shutter acts to illuminate the fiber optic cables individually and sequentially, in much the same manner as accomplished with the scanning laser apparatus. Again, three separate light sources may be used in the alternative embodiment, corresponding to the three basic colors of red, green and blue.

Other features and advantages of the present invention will become apparent from the following more detailed description, taken in conjunction with the accompanying drawings which illustrate, by way of example, the principles of the invention.

BRIEF DESCRIPTION OF THE DRAWINGS

The accompanying drawings illustrate the invention. In such drawings:

FIG. 1 is a logic diagram illustrating the processing of a composite video signal for presentation by a thin projection screen;

FIG. 2 is a fragmented cutaway view of a thin projection screen constructed in accordance with the present invention, illustrating a sheet of parallel fiber optic cables and an overlying LCD screen having a plurality of parallel shutters, wherein light emitted by the fiber optic cables is intercepted and further transmission is controlled by the opacity and/or transparency of the overlying parallel shutters;

FIG. 3 is an enlarged, fragmented cross-sectional view of the flat projection screen taken generally along line 3—3 of FIG. 2, illustrating the fiber optic cables and their specially-planed, light emitting surfaces that lie immediately adjacent to the LCD screen;

DETAILED DESCRIPTION OF THE PREFERRED EMBODIMENTS

Figure 4:
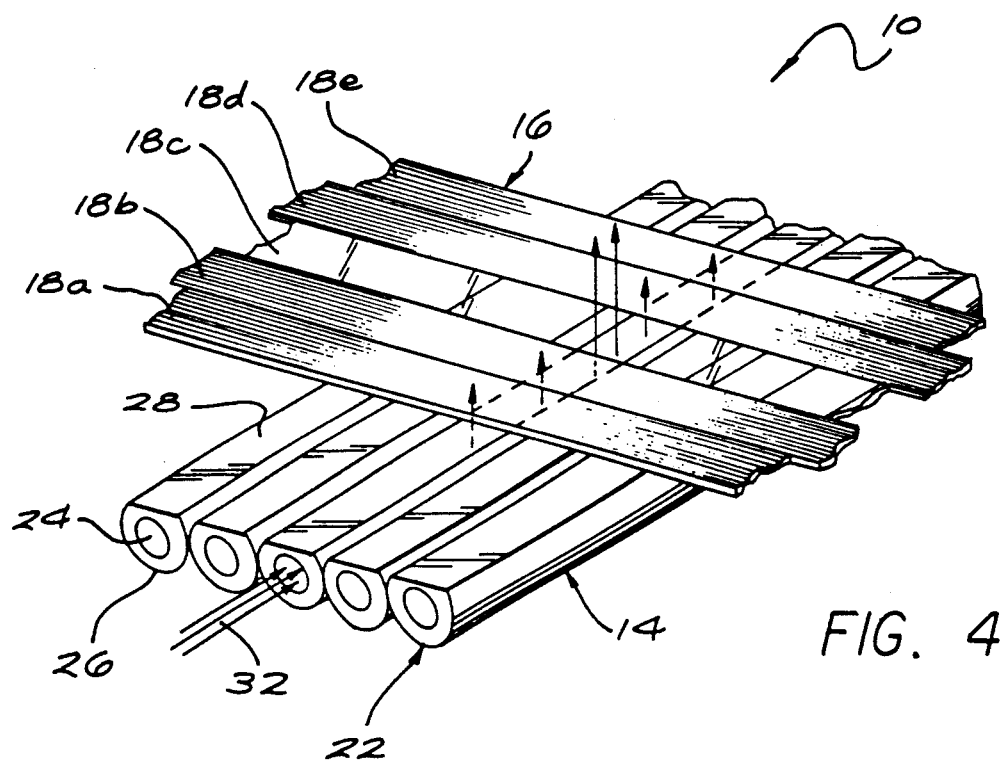
FIG. 4 is an enlarged perspective view taken generally of the area designated by the arrow 4 in FIG. 2, illustrating a section of the fiber optic cable sheet and a section of the overlying LCD screen, wherein light is shown entering a fiber optic cable and then being selectively blocked or allowed to pass by the different shutters of the overlying section of the LCD screen.

As shown in the drawings for purposes of illustration, the present invention resides in an improved viewing system that enables a video image to be projected from a relatively thin projection screen 10. In accordance with the invention, the viewing system itself comprises two major portions, namely the projection screen 10 and a control apparatus 12. The projection screen 10 includes a sheet of parallel fiber optic cables 14, and an overlying LCD screen 16 having a plurality of parallel liquid crystal shutters 18. The control apparatus 12 receives the incoming video signal 20 and converts it into a video signal recognizable by the thin projection screen 10 while maintaining the image represented therein. In this way, the improved viewing system of the present invention is able to take an incoming video signal as would be received by the common CRT type television, and display or project it so that the same image is seen by the viewer of the thin projection screen.

The relatively thin projection screen 10 is lightweight, emits no eye-fatiguing radiation, and projects a clear image through a wide angle. Being thin, the screen 10 also saves space, and its light weight allows it to be hung or positioned easily. The method by which images are generated on the relatively thin projection screen 10 is adaptable not only to current modes of television signal transmission, but also to foreseeable future modes that may be developed due to the simple, but effective, nature of the invention.

With reference to FIG. 3, the fiber optic cable sheet 14 includes a plurality of parallel fiber optic cables 22. Each individual fiber optic cable 22 has, in cross-section, a circular light conducting core 24 and an asymmetrical light-insulating tubular sheath 26 surrounding the light conducting core 24. Each fiber optic cable 22 conducts light along its longitudinal axis through the central light conducting core 24. The sheath 26 is specially treated so it is flat on one side 28. This flat surface 28 is preferably created by a machine process, since most fiber optic cables 22 have sheaths 26 that are cylindrically tubular. The machining of the sheaths 26 brings the flat side 28 closer to the light conducting core 24 of the fiber optic cable 22. This increases light emission through the sheath 26 and provides a means for preferentially transmitting light from a fiber optic cable in a direction transverse to its longitudinal axis.

The flat surfaces 28 of the fiber optic cables 22 are all coplanar so that the sheet 14 essentially has a light emitting surface. This flat, light emitting surface is placed immediately adjacent to the LCD screen 16 so that light emitted from the fiber optic cable sheet 14 must pass through the LCD screen 16 before reaching the viewer.

The fiber optic cable sheet 14 includes 525 individual horizontal fiber optic cables 22, corresponding to the number of raster lines in the usual television signal. The overlying LCD screen 16 comprises a plurality of vertical liquid crystal shutters 18. Here, 380 vertical liquid crystal shutters 18 form the LCD screen 16 in order to correspond with usual television signals. Each liquid crystal shutter 18 is of the same construction and can be selectively modulated to be opaque to incident light for allowing as little light as possible to pass through, translucent to incident light allowing only some of the light to pass through, or can be transparent to incident light and allow as much light as possible to pass through.

In FIG. 2, light represented by the arrow 30 illuminates or energizes a single fiber optic cable 22. A portion of the overlying LCD screen 16 is shown with seven translucent or transparent shutters 18 allowing light to pass through while the remaining liquid crystal shutters are opaque and allow none of the light to pass through. In this way, picture elements, or pixels, are generated by the crossovers of each energized fiber optic cable 22 and the liquid crystal shutters 18 of the LCD screen 16.

A portion of FIG. 2 is enlarged in FIG. 4 to show the light transmission and light blocking process. Light represented by the arrows 32 enters a fiber optic cable 22 of the fiber optic cable sheet 14. This light is then preferentially retransmitted in a direction transverse to the longitudinal axis of the The synchronization circuit 40 controls light input to the fiber optic cables 22 by providing a signal to an RGB light driver 42, which in turn activates and controls a scanning laser apparatus 44. Where a color image is being generated by the thin projection screen 10, the scanning laser apparatus may include three separate lasers: a red laser, a green laser and a blue laser. Once in operation, each of these lasers alternately illuminates the fiber optic cables 22 of the fiber optic cable sheet 14, beginning at one end of the fiber optic cable sheet, and individually illuminating, in a sequential manner, each fiber optic cable 22. After the red laser sequentially illuminates each individual cable 22 of the fiber optic cable sheet 14, the RGB light driver 42 then causes the green laser to likewise sequentially illuminate each individual cable 22 of the fiber optic sheet 14. The process is repeated when the RGB light driver activates the blue laser, followed by the red laser, etc. Again, it should be emphasized that this process is not perceivable by a normal viewer, since the frequency of operation is usually set at the same frequency as the input video signal, and in the case of television signals at 32.6 kHz.

As each cable 22 is illuminated, the synchronization circuit 40 simultaneously provides an input signal to the bank of LCD drivers 38 to permit appropriate modulation of the LCD screen 16 in accordance with input received from the processor 36. Thus, as the first cable 22 is illuminated by the red scanning laser 44, the bank of LCD drivers 38 individually modulates each of the liquid crystal display panels or shutters 18 of the LCD screen 16, simultaneously to present one row of red light of varying intensity corresponding to the input video signal 20. As the next adjacent cable 22 is illuminated, the shutters 18 of the LCD screen 16 are remodulated by the LCD drivers 38 to present another fiber optic cable 22 as determined by the flat surface 28. Upon transmission from the flat surface 28, the light then encounters the LCD screen 16. Liquid crystal shutters 18a, 18b, 18d and 18e are opaque and block the light transmitted from the fiber optic cable 22. The shutter 18c is transparent and the light emitted by the underlying fiber optic cable 22 is allowed to pass through and be seen by a viewer. FIG. 4 shows the generation of a single pixel by the cross over point of an energized fiber optic cable 22 and the translucent or transparent liquid crystal shutter 18c.

Figure 5:
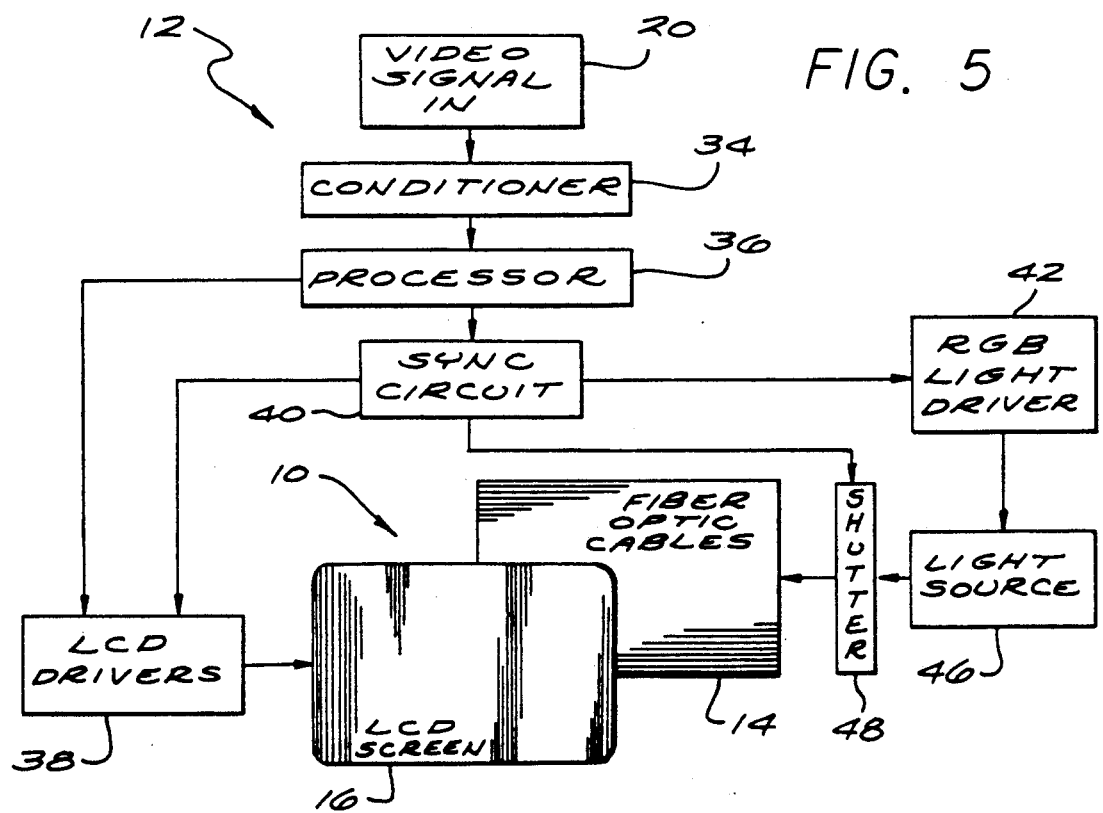
FIG. 5 is a logic diagram similar to FIG. 1, illustrating an alternative method for processing a composite video signal, wherein a scanning laser shown in FIG. 1 is replaced by a light source and an associated shutter.

Two different but similar embodiments of the control apparatus 12 are illustrated in FIGS. 1 and 5. In FIG. 1 the incoming video signal 20 is received by a conditioner 34. The conditioner changes the analog incoming video signal 20 to a digital representation thereof. The digitized signal is then passed to a processor 36 which splits the signal into a portion for the LCD screen 16, and another portion for the fiber optic cable sheet 14.

The processor 36 has the primary function of providing a signal to a bank of LCD drivers 38 which simultaneously modulate each of the shutters 18 of the LCD screen 14 to recreate an optical image from the incoming video signal 20. The bank of LCD drivers 38 include individual electrical connections to each liquid crystal display panel or shutter 18 for controlling the transparency, translucency or opacity of each shutter. By modulating each of the shutters 18 individually, and yet operating all of the shutters 18 forming the LCD screen 16 simultaneously, in connection with the illumination of a single fiber optic cable 22, an optical image can be accurately recreated from the input video signal 20.

More particularly, with reference to a normal television video signal, such a signal is normally transmitted at a frequency of 32.6 kHz, and provides red, green and blue light data for 199,500 pixels, which correspond to the 525 raster lines and 380 vertical columns provided in most television sets. The thin projection screen 10 of the present invention can accurately produce light at each of these 199,500 pixels in accordance with the normal television signal by means of selectively illuminating each individual fiber optic cable 22 sequentially, and by modulating the LCD screen 16 each time an individual fiber optic cable 22 is illuminated. The entire process takes place at such a high frequency that the human eye is incapable of detecting the fact that all of the fiber optic cables 22 are not illuminated simultaneously, and that modulation of the individual shutters 18 of the LCD screen 16 is changing each time an individual fiber optic cable is illuminated. Further, the human eye is incapable of detecting, during the generation of a color optical image, that all of the fiber optic cables are illuminated by a red light source, and finally they are subsequently all illuminated by a green light source, and then they are all illuminated by a blue light source, with this process repeating itself in order to recreate the optical image.

For example, after an input video signal 20 has been digitized by the conditioner 34, the processor separates red data, green data and blue data and temporarily stores the data. The processor 36 provides input data to a synchronization circuit 40 which insures that simultaneous modulation of all of the shutters 18 of the LCD screen 16 occurs each time an individual fiber optic cable 22 is illuminated. The synchronization circuit 40 also provides means for coordinating light input to the fiber optic cables 22 with modulation of the shutters 18, to ensure that only modulation appropriate for a particular color (whether it be red, green or blue) of the LCD screen 16, occurs as at particular color is being fed into a fiber optic cable sheet 14. line of red images providing nothing more than a potential line of 380 pixels corresponding to the number of shutters 18 overlying that particular cable 22. This process is repeated individually for each subsequent cable 22 as it is illuminated by the red laser.

After this process has been completed utilizing a red laser, the RGB light driver 42 then activates a green laser which, like the red laser, illuminates a first cable 22. Again, the bank LCD drivers, in accordance with input received from the processor 36 and the synchronization circuit 40, modulates, simultaneously, all of the shutters 18 of the LCD screen 16 to present a row of 380 green pixels of varying light intensity. As the next adjacent or second cable 22 is illuminated by the green laser, the bank of LCD drivers 38 re-modulates, simultaneously, all of the shutters 18 of the LCD screen 16 to present another green row of 380 pixels. This is repeated, individually and sequentially with all of the fiber optic cables 22 comprising the fiber optic cable sheet 14.

After the last of the fiber optic cables 22 is illuminated with green light and the LCD screen 16 is appropriately modulated, then the RGB light driver 42 activates the blue scanning laser to likewise individually and sequentially illuminate each of the fiber optic cables. This entire process is repeated as long as the thin projection screen 10 continues to receive input video signals and process them.

In an alternative embodiment illustrated in FIG. 5, the scanning laser apparatus 44 of FIG. 1 is replaced by a light source 46 and an associated shutter 48. The light source 46 includes three separate high intensity and highly responsive light bulbs corresponding to the three primary colors (red, green and blue) found in typical video input signals. The light bulbs are arranged so that each of them is capable of illuminating the entire fiber optic cable sheet 14, and the shutter 48 is interposed between the light source 46 and the fiber optic cable sheet 14 in order to selectively control illumination of individual fiber optic cables 22. The RGB light driver 42, which receives input from the synchronization circuit 40, controls activation of the various light bulbs comprising the light source 46. The shutter 48 receives input directly from the synchronization circuit. The shutter 48 operates to insure that the fiber optic cables 22 of the fiber optic cable sheet 14 are individually and sequentially illuminated in much the same manner as done by the scanning laser apparatus. In this regard, the shutter 48 includes one or more apertures capable of individually permitting light to pass from the light source 46 into the ends of each individual one of the 525 fiber optic cables 52.

With this minor modification, the control apparatus 12 found in FIG. 5 is precisely identical in construction and operation with that described in connection with FIG. 1. The shutter 48 controls illumination of the fiber optic cables 22 so that as each cable is individually illuminated, the LCD screen 16 is modulated in accordance with signals and data received from the processor 36 and the synchronization circuit 40, to control the intensity of light permitted to pass through the LCD screen 16 to a viewer, at the particular line and for the color being generated at that time (red, green or blue).

From the foregoing it is apparent that the relatively thin projection screen is lightweight, highly maneuverable, and takes up little space. It can be almost any size without losing clarity of image, and is highly adaptable to almost any mode of video signal including television signals and also graphic signals generated by computers. Different modes of television transmission, such as high definition television signals, can also be adapted for image generation by the novel projection screen. The relatively thin projection screen may be hung on a wall, or placed on an easel or a shelf. The image generated by the relatively thin projection screen does not lose its clarity when it is viewed at an oblique angle, nor does it generate eye fatiguing radiation.

While two particular forms of the invention have been illustrated and described, it will be apparent that various modifications can be made to each without departing from the spirit and scope of the invention. Accordingly, it is not intended that the invention be limited, except as by the appended claims.

We claim:

1. An image projection system, comprising:
   a medium capable of emitting light laterally from its path;
   means for sequentially feeding light into successive portions of the medium;
   means for intercepting light emitted laterally from the medium, the light intercepting means including a plurality of shutters which overlie the medium in a manner controlling transmission of and the intensity of the medium-emitted light permitted to pass therethrough for viewing; and
   means for modulating the shutters of the intercepting means in response to an input video signal and in synchronization with light being emitted by successive portions of the medium.

2. An image projection system as set forth in claim 1, wherein the medium comprises a sheet of parallel fiber optic cables, and each cable is constructed to conduct light along its longitudinal axis and emit light laterally in a selected direction.

3. An image projection system as set forth in claim 1, wherein the means for sequentially feeding light into successive portions of the medium includes a scanning laser capable of selectively feeding light into the medium.

4. An image projection system as set forth in claim 1, wherein the means for sequentially feeding light into successive portion of the medium includes a light source and a light source-associated shutter which controls the selective illumination of the medium.

5. An image projection system as set forth in claim 2, wherein each fiber optic cable includes a planar surface through which light passes from the fiber optic cable in the selected direction.

6. An image projection system as set forth in claim 1, wherein the plurality of shutters which overlie the medium form a liquid crystal display screen, wherein the shutters are arranged over the underlying medium in a perpendicular orientation relative to a light pathway through the underlying medium.

7. An image projection system as set forth in claim 6, wherein the liquid crystal display screen is oriented over the underlying sheet of parallel fiber optic cables such that substantially all of the shutters overlie at least a portion of each fiber optic cable.

8. An image projection system as set forth in claim 6, wherein the means for modulating the shutters comprises a bank of liquid crystal drivers, wherein each driver is electrically connected to a respective single liquid crystal shutter, to impress upon the shutter an electrical signal by which the transparency, translucency, or opacity of the shutter is controlled in accordance with the input video signal.

9. An image projection system as set forth in claim 8, wherein the means for modulating the shutters includes a synchronization circuit which coordinates illumination of the medium with modulation of the shutters.

10. An image projection system as set forth in claim 1, including a control apparatus having a processor which separates the input video signal into data needed to drive the means for sequentially feeding light into successive portions of the medium, and into data to drive the means for modulating the shutters of the intercepting means.

11. A video projection system, comprising:
    a sheet of parallel fiber optic cables, wherein each cable is constructed to conduct light along its longitudinal axis and emit light laterally in a selected direction;
    means for intercepting light emitted from the fiber optic cables in the selected direction, the light intercepting means including a plurality of shutters which overlie the fiber optic cables in a manner to control the transmission and intensity of cable-emitted light therethrough for viewing, wherein the shutters are arranged over the fiber optic cables to provide a plurality of pixels at cross over points of the shutters relative to the underlying fiber optic cables; and
    means for coordinating light input to the fiber optic cables with modulation of the shutters of the intercepting means in accordance with an input video signal, to provide an optical reproduction of the input video signal from a light matrix provided by the pixels.

12. A video projection system as set forth in claim 11, wherein each fiber optic cable includes a planar surface through which light passes from the fiber optic cable in the selected direction.

13. A video projection system as set forth in claim 12, wherein the means for intercepting light emitted laterally from the medium comprises a liquid crystal display screen.

14. A video projection system as set forth in claim 11, wherein the plurality of shutters which overlie the medium form a liquid crystal display screen, and the shutters are arranged over the underlying medium in a perpendicular orientation relative to a light pathway through the underlying medium, and wherein the liquid crystal display screen is oriented over the underlying sheet of parallel fiber optic cables such that substantially all of the shutters overlie at least a portion of each fiber optic cable.

15. A video projection system as set forth in claim 11, wherein the shutters of the light intercepting means each comprise a liquid crystal display panel, and wherein the coordinating means includes means for driving each such liquid crystal display panel, each driving means being electrically connected to a single liquid crystal display panel to impress thereon an electrical signal by which the transparency, translucency or opacity of the respective liquid crystal display panel is controlled in accordance with the input video signal.

16. A video projection system as set forth in claim 15, wherein the coordinating means includes a processor which separates and processes data received from the input video signal into a portion thereof required for signaling the driving means, and another portion thereof which causes the sequential illumination of individual cables of the sheet of parallel fiber optic cables, and wherein the coordinating means further includes a synchronization circuit that coordinates selective illumination of the cables in the sheet of parallel fiber optic cables with modulation of the liquid crystal display panels.

17. A video projection system as set forth in claim 16, wherein the coordinating means includes means for conditioning the input video signal to transform the same from an analog signal to an output digital signal prior to reception by the processing means.

18. A video projection system as set forth in claim 17, including means for sequentially illuminating individual cables of the sheet of parallel fiber optic cables in accordance with input from the processor and the synchronization circuit.

19. A video projection system as set forth in claim 18, wherein the illumination means includes a scanning laser.

20. A video projection system as set forth in claim 18, wherein the illumination means includes a light source positioned adjacent to an end of the sheet of parallel fiber optic cables, and a light source-associated shutter having means for selectively exposing the ends of individual cables to the light source.

21. A process for converting a video signal into an image on a screen, the steps comprising:
providing a screen comprising a plurality of rows which can be selectively illuminated, and a plurality of columns interposed over the rows for modulating light emitted from the rows, wherein the step of providing a screen includes providing a sheet of fiber optic cables which form the rows which can be selectively illuminated, wherein each fiber optic cable includes a flat surface which permits emission of light from a conductive core thereof in a direction transverse to the longitudinal axis of the fiber optic cable, wherein the flat surfaces of the fiber optic cables lie generally coplanar with one another so that light emitted therefrom is generally uniformly directed towards the plurality of columns;
processing the video signal into data corresponding to the plurality of rows and columns;
driving a light source to sequentially illuminate the rows; and
controlling light transmission from the rows to a viewer by modulating the columns, wherein the column modulation produces a dot matrix which creates an image corresponding to the video signal.

22. A process for converting a video signal as set forth in claim 21, wherein the step of providing a screen having a plurality of columns includes the provision of a plurality of liquid crystal display panels which each extend substantially the height of the sheet of fiber optic cables so that each liquid crystal display panel intersects at least a portion of substantially all of the individual cables of the fiber optic cable sheet.

23. A process for converting a video signal as set forth in claim 21, wherein the step of processing the video signal includes the steps of transforming the video signal from an analog signal to a digital signal, and processing the digital signal into data appropriate to the plurality of columns and data appropriate to the plurality of rows such that as each row is sequentially illuminated, all of the columns which are interposed over the rows are simultaneously modulated to control light passage therethrough in order to re-create an optical image corresponding to the video signal.

24. A process for converting a video signal as set forth in claim 21, wherein the step of driving a light source to sequentially illuminate the rows includes providing a scanning laser for illuminating each of said rows in synchronization with modulation of the plurality of columns.

25. A process for converting a video signal as set forth in claim 24, wherein the step of providing a scanning laser includes a provision of three separate lasers which emit, respectively, red light, green light and blue light, wherein each of the lasers alternately and sequentially illuminates the plurality of rows in a sequential manner which, in connection with modulation of the plurality of columns, creates a color image.

26. A process for converting a video signal as set forth in claim 21, wherein the step of driving a light source to sequentially illuminate the rows includes the provision of a light source and an associated shutter which permits light emitted from the light source to be fed individually and sequentially into the plurality of rows.

27. An image projection system, comprising:
a sheet of fiber optic cables, wherein each cable includes an inner light conducting core and an outer light insulating sheath that has a flat surface through which light escapes laterally through the fiber optic cable, wherein the flat surfaces of the fiber optic cables are coplanar to commonly direct light escaping therefrom in a selected direction;
a liquid crystal display (LCD) screen positioned immediately adjacent to the sheet of fiber optic cables to intercept light emitted therefrom in the selected direction, the LCD screen including a plurality of liquid crystal display panels wherein the longitudinal axes thereof span the LCD screen approximately perpendicular to the longitudinal axis of the underlying fiber optic cables, wherein each liquid crystal display panel is able to independently control and modulate the intensity of light emitted by the underlying fiber optic cable sheet to create a dot-matrix of pixels formed by the intersection of a single illuminated fiber optic cable and a single liquid crystal display panel;
means for modulating the liquid crystal display panels of the LCD screen and synchronizing modulation thereof with the illuminated portion of the fiber optic cable sheet to create an optical image corresponding to an input video signal, the modulating means including means for digitizing the incoming analog video signal, means for processing the digitized video signal into signals for controlling modulation of the liquid crystal display panels and for controlling light input to the fiber optic cables, and means for synchronizing modulation of all of the liquid crystal display panels with a corresponding illuminated portion of the fiber optic cable sheet;
an LCD driver which receives signals from the processing means representing a modulation sequence for the liquid crystal display panels, stores the modulation sequence for the liquid crystal display panels until signalled by the synchronizing means, and then sends the stored sequence received from the processing means to the liquid crystal display panels so that the liquid crystal display panels will modulate light emitted by the underlying illuminated portion of the fiber optic cable sheet as is appropriate to present an image represented by the input video signal;
a light source for illuminating the fiber optic cables by sequentially illuminating portions thereof appropriate to the video signal; and a light driver which receives input signals from the synchronizing means and controls operation of the light source.

28. An image projection system as set forth in claim 27, wherein the light source includes a scanning laser assembly including a scanning laser capable of emitting each color required by the incoming video signal for illuminating sequential portions of the fiber optic cables.

29. An image projection system as set forth in claim 27, wherein the light source includes a uniform light source capable of fully illuminating the fiber optic cable sheet, and a shutter apparatus associated therewith, wherein the shutter apparatus is positioned between the light source and the fiber optic cable sheet to control illumination of the fiber optic cable sheet so as to permit selective and sequential illumination of portions thereof in accordance with modulation of the liquid crystal display panels.

30. A process for converting a video signal into an image on a screen, the steps comprising:
providing a screen comprising a plurality of rows which can be selectively illuminated, and a plurality of columns interposed over the rows for modulating light emitted from the rows;
processing the video signal into data corresponding to the plurality of rows and columns;
driving a light source to sequentially illuminate the rows, including the provision of a light source and an associated shutter which permits light emitted from the light source to be fed individually and sequentially into the plurality of rows; and
controlling light transmission from the rows to a viewer by modulating the columns, wherein the column modulation produces a dot matrix which creates an image corresponding to the video signal.

* * * * *

UNITED STATES PATENT AND TRADEMARK OFFICE
CERTIFICATE OF CORRECTION

PATENT NO.   : 5,018,007
DATED        : May 21, 1991
INVENTOR(S)  : Paul W. Lang and Franklin C. Gribshaw It is certified that error appears in the above-identified patent and that said Letters Patent is hereby corrected as shown below:

In column 6, line 22, following "the longitudinal axis of the", the text continues at column 6, lines 58 and 59 with "fiber optic cable 22", to column 7, line 62, ending with "a fiber optic cable sheet 14."

Thereafter, the text continues with the paragraph commencing in column 6, line 23. Then, in column 6, line 58, following "the LCD drivers 38 to present another", the text continues at column 7, line 62 with "line of red images providing" and continues thereafter.

In column 8, line 47, the number "52" should be --22--.

Signed and Sealed this

Twenty-second Day of December, 1992

Attest:

DOUGLAS B. COMER

*Attesting Officer*    *Acting Commissioner of Patents and Trademarks*